US008674873B2

(12) United States Patent
Shibata et al.

(10) Patent No.: US 8,674,873 B2
(45) Date of Patent: Mar. 18, 2014

(54) SIGNAL PROCESSING APPARATUS, RADAR APPARATUS, OBJECT DETECTION SYSTEM, SIGNAL PROCESSING METHOD, AND COMPUTER-READABLE MEDIUM

(75) Inventors: Shinichi Shibata, Kobe (JP); Hideki Kajioka, Kobe (JP)

(73) Assignee: Fujitsu Ten Limited, Kobe-shi (JP)

( * ) Notice: Subject to any disclaimer, the term of this patent is extended or adjusted under 35 U.S.C. 154(b) by 302 days.

(21) Appl. No.: 12/882,622

(22) Filed: Sep. 15, 2010

(65) Prior Publication Data

US 2011/0074622 A1 Mar. 31, 2011

(30) Foreign Application Priority Data

Sep. 25, 2009 (JP) ................................. 2009-220745

(51) Int. Cl.
*G01S 13/00* (2006.01)
(52) U.S. Cl.
USPC .............................. 342/70; 342/118; 342/133
(58) Field of Classification Search
USPC ....................................................... 342/70–72
See application file for complete search history.

(56) References Cited

U.S. PATENT DOCUMENTS

| | | | | |
|---|---|---|---|---|
| 5,619,208 | A * | 4/1997 | Tamatsu et al. | 342/70 |
| 6,140,954 | A * | 10/2000 | Sugawara et al. | 342/70 |
| 6,317,073 | B1 * | 11/2001 | Tamatsu et al. | 342/70 |
| 7,579,981 | B2 * | 8/2009 | Kishida | 342/109 |
| 2003/0048216 | A1 * | 3/2003 | Kishida | 342/70 |
| 2003/0052813 | A1 * | 3/2003 | Natsume | 342/70 |

(Continued)

FOREIGN PATENT DOCUMENTS

| | | |
|---|---|---|
| DE | 602 12 556 T2 | 7/2007 |
| JP | A-11-344559 | 12/1999 |

(Continued)

OTHER PUBLICATIONS

Aug. 20, 2013 Office Action issued in Japanese Patent Application No. 2009-220745 (with English Translation).

(Continued)

*Primary Examiner* — John B Sotomayor
*Assistant Examiner* — Marcus Windrich
(74) *Attorney, Agent, or Firm* — Oliff PLC

(57) ABSTRACT

A signal processing apparatus performs an object detection process of detecting object data with respect to peak signals which indicate a difference in frequency between a transmitted signal of which the frequency is changed in a predetermined period and a received signal which is obtained by receiving a reflected wave that corresponds to a transmitted wave which is based on the transmitted signal and is reflected from an object, by deriving the peak signals in a first period where the frequency of the transmitted signal ascends and in a second period where the frequency of the transmitted signal descends and by pairing the peak signals in the first period and the second period. A continuity determination section determines a continuity between the object data and past object data detected prior to the object data. A moving objection data detection section detects newly detected moving object data that has no continuity with the past object data among the object data as a result of continuity determination by the continuity determination section. A position relationship detection section detects a position relationship between the moving object data and other object data. A data determination section re-pairs the moving object data if one object data among the other object data has a predetermined position relationship with the moving object data.

8 Claims, 8 Drawing Sheets

(56) References Cited

U.S. PATENT DOCUMENTS

| | | | |
|---|---|---|---|
| 2003/0112173 A1* | 6/2003 | Seki et al. | 342/70 |
| 2003/0122702 A1* | 7/2003 | Kishida et al. | 342/70 |
| 2005/0174282 A1* | 8/2005 | Nakanishi et al. | 342/109 |
| 2007/0040731 A1* | 2/2007 | Kishida | 342/109 |

FOREIGN PATENT DOCUMENTS

| | | |
|---|---|---|
| JP | A-2000-019245 | 1/2000 |
| JP | A-2003-149325 | 5/2003 |
| JP | A-2003-185744 | 7/2003 |
| JP | A-2003-240843 | 8/2003 |
| JP | A-2004-012198 | 1/2004 |
| JP | A-3675758 | 5/2005 |
| JP | A-2006-126133 | 5/2006 |

OTHER PUBLICATIONS

Nov. 8, 2013 Office Action issued in Germany Patent Application No. 10 2010 037 565.9 (with English Translation).

* cited by examiner

SIGNAL PROCESSING APPARATUS, RADAR APPARATUS, OBJECT DETECTION SYSTEM, SIGNAL PROCESSING METHOD, AND COMPUTER-READABLE MEDIUM

The disclosure of Japanese Patent Application No. 2009-220745 filed on Sep. 25, 2009, including specification, drawings and claims is incorporated herein by reference in its entirety.

BACKGROUND

The present invention relates to the technology of detecting an object based on information from a transmitted wave and a received wave.

In the case of detecting an object using a radar apparatus, a relative distance and a relative speed of the object are detected from peak signals which are detected by a difference in frequency between a transmitted signal obtained from a transmitted wave and a received signal obtained from a received wave through mixing of the transmitted signal and the received signal. Here, the peak signal means a frequency spectrum having a signal intensity that is equal to or higher than a predetermined value.

Also, in the case of detecting an object based on a FM-CW system, a relative distance and a relative speed of the object are detected by extracting peak signals from an up period and a down period of a transmitted signal and a received signal and combining the peak signals between the up period and the down period. Here, the combination of the peak signals is determined by information on a speed of a vehicle provided with a radar apparatus, and a signal intensity and an angle of a peak signal, and is used to control the vehicle as object data.

[Patent Document 1] JP-A-2004-12198

However, if the peak signal in the up period and the peak signal in the down period are wrongly combined to cause a miss-pairing, there is a possibility that the vehicle is controlled based on wrong object data. For this, Patent Document 1 describes that if moving object data exists in an area of continuous standstill object data, it is processed as a miss-pairing. According to this process, in the case of determining whether the moving object data is caused by miss-pairing, the detection of the continuous standstill object data is set forth as a premise, while in the case where the continuous standstill object data is not detected, it may not be possible to determine whether the moving object data is caused by miss-pairing. Accordingly, in the case where the continuous standstill object data does not exist, the vehicle control is performed based on wrong pairing data, and thus the safety of the vehicle user may be retarded.

SUMMARY

It is therefore an object of at least one embodiment of the present invention to detect miss-pairing of moving object data.

In order to achieve at least one of the above-described objects, according to a first aspect of the embodiments of the present invention, there is provided a signal processing apparatus that performs an object detection process of detecting object data with respect to peak signals which indicate a difference in frequency between a transmitted signal of which the frequency is changed in a predetermined period and a received signal which is obtained by receiving a reflected wave that corresponds to a transmitted wave which is based on the transmitted signal and is reflected from an object, by deriving the peak signals in a first period where the frequency of the transmitted signal ascends and in a second period where the frequency of the transmitted signal descends and by pairing the peak signals in the first period and the second period, the signal processing apparatus comprising: a continuity determination section that determines a continuity between the object data and past object data detected prior to the object data; a moving objection data detection section that detects newly detected moving object data that has no continuity with the past object data among the object data as a result of continuity determination by the continuity determination section; a position relationship detection section that detects a position relationship between the moving object data and other object data; and a data determination section that repairs the moving object data if one object data among the other object data has a predetermined position relationship with the moving object data.

By determining whether the moving object data is caused by miss-pairing based on the object data in the vicinity of both the front and the rear of the moving object data on the basis of the newly detected moving object data, the determination of miss-pairing is performed early enough with respect to a small number of subjects to be determined, and thus wrong vehicle control is prevented to guarantee the security of the vehicle user.

The predetermined position relationship may be a position relationship in which the other object data exists within a determined area that is prescribed by the position of the moving object data.

By determining whether the moving object data is error data caused by miss-pairing based on the determination area that is prescribed by the newly detected moving object data, the determination of miss-pairing is performed early enough with respect to a small number of subjects to be determined, and thus wrong vehicle control is prevented to guarantee the security of the vehicle user.

The predetermined position relationship may be a position relationship in which the other object data exists in the vicinity of either the front or the rear in the traveling direction of the moving object data.

By determining whether the moving object data is caused by miss-pairing based on the object data in the vicinity of either the front or the rear of the moving object data on the basis of the newly detected moving object data, the determination of miss-pairing is performed early enough with respect to a small number of subjects to be determined, and thus wrong vehicle control is prevented to guarantee the security of the vehicle user.

The predetermined position relationship may be a position relationship in which the other object data exists in the vicinity of both the front and the rear in the traveling direction of the moving object data.

By determining whether the moving object data is caused by miss-pairing based on the object data in the vicinity of either the front or the rear of the moving object data on the basis of the newly detected moving object data, the determination of miss-pairing is performed early enough with respect to a small number of subjects to be determined, and thus wrong vehicle control is prevented to guarantee the security of the vehicle user.

The signal processing apparatus may further comprises performing section that performs a re-pairing process only with respect to error data if there is the data that is determined as the error data by the data determination section.

By performing the pairing process only with respect to pairing data that is determined as error data by the data determination means, the error data can be made as normal pairing data with a small amount of processing, and thus wrong vehicle control is prevented to guarantee the security of the vehicle user.

According to a second aspect of the embodiments of the present invention, there is provided a radar apparatus comprising the signal processing apparatus according to the first aspect; an output and reception section that outputs the transmitted wave and receives the reflected wave; and an object information output section that outputs object information detected in the object detection process to an electronic control device which uses the object information.

According to a third aspect of the embodiment of the present invention, there is provided an object detection system comprising: the radar apparatus according to the second aspect; and a detection section that detects an object based on the object data output from the radar apparatus.

According to a fourth aspect of the embodiment of the present invention, there is provided a signal processing method that performs an object detection process of detecting object data with respect to peak signals which indicate a difference in frequency between a transmitted signal of which the frequency is changed in a predetermined period and a received signal which is obtained by receiving a reflected wave that corresponds to a transmitted wave which is based on the transmitted signal and is reflected from an object, by deriving the peak signals in a first period where the frequency of the transmitted signal ascends and in a second period where the frequency of the transmitted signal descends and by pairing the peak signals in the first period and the second period, the signal processing method comprising: determining a continuity between the object data and past object data detected prior to the object data; detecting newly detected moving object data that has no continuity with the past object data among the object data as a result of continuity determination by the continuity determination section; detecting a position relationship between the moving object data and other object data; and re-pairing the moving object data if one object data among the other object data has a predetermined position relationship with the moving object data.

According to a fifth aspect of the invention, there is provided a computer-readable medium recording a program causing a computer to execute the method according to the fourth aspect.

DETAILED DESCRIPTION OF THE EMBODIMENTS

Hereinafter, embodiments of the invention will be described with reference to the accompanying drawings.

<1. Configuration>

Figure 1:
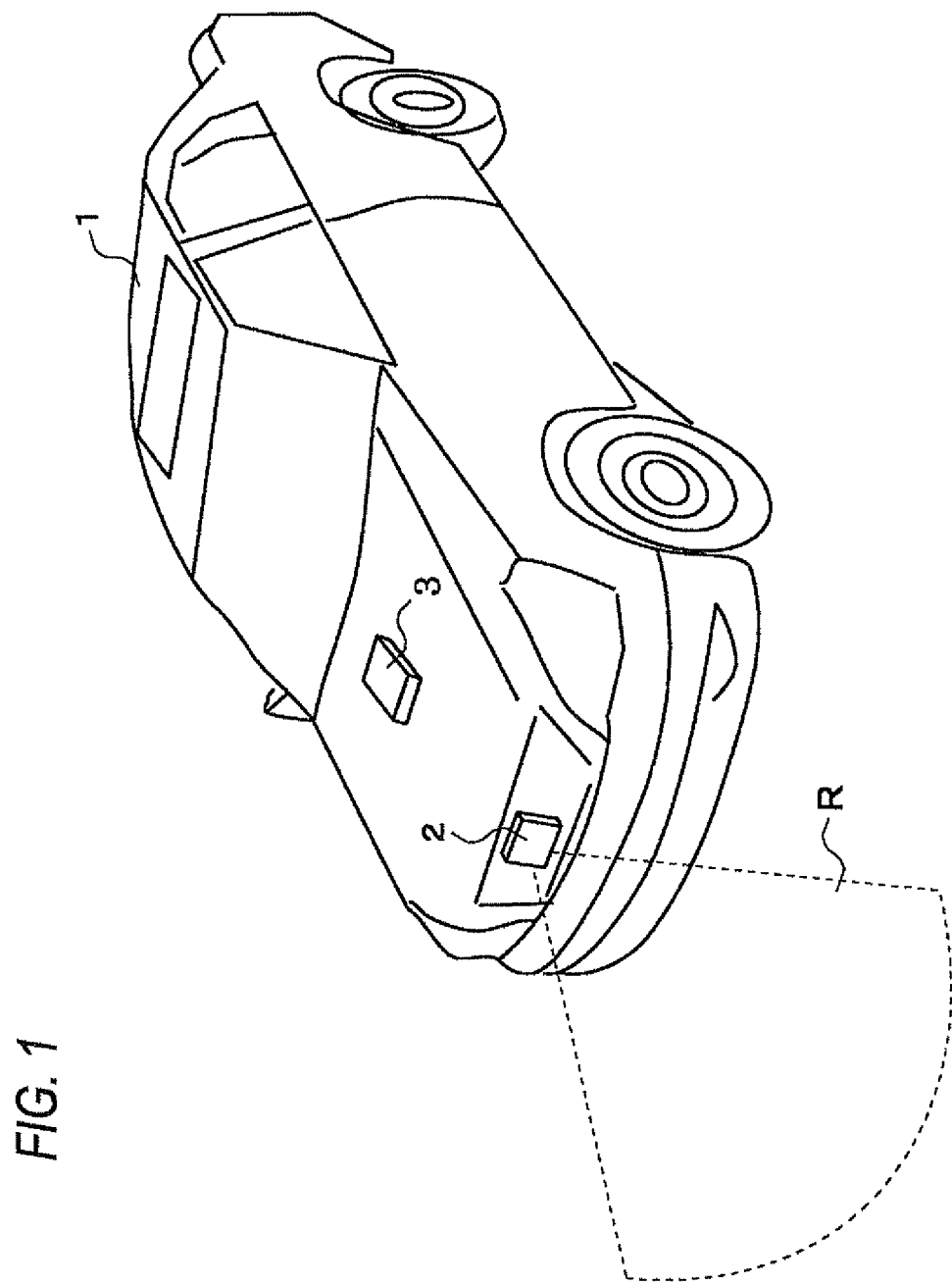
FIG. 1 is a view illustrating the whole vehicle.

FIG. 1 is a view illustrating the whole vehicle 1. In a vehicle 1, an object detection system according to an embodiment of the invention includes a radar apparatus 2 and an electronic control unit 3. The radar apparatus 2 is installed in a front portion of the vehicle. The radar apparatus 2 detects a relative distance and a relative speed between the vehicle 1 and an object by scanning a detected range R, and an angle of the object as seen from the vehicle 1. In this case, the mount position of the radar apparatus 2 is not limited to the front portion of the vehicle, but may be in the rear or side of the vehicle 1.

The electronic control unit 3 performs a vehicle control of the vehicle 1 in accordance with the result of detecting the object through the radar apparatus 2. Examples of the vehicle control may include accelerate control, brake control, and brake control for preventing collision in the case of traveling to follow a vehicle in front. Also, the electronic control unit 3 makes a passenger fixed to a seat with a seat belt to provide the passenger against a shock or fixes a headrest to reduce damage to the body of the passenger during vehicle collision.

Figure 2:
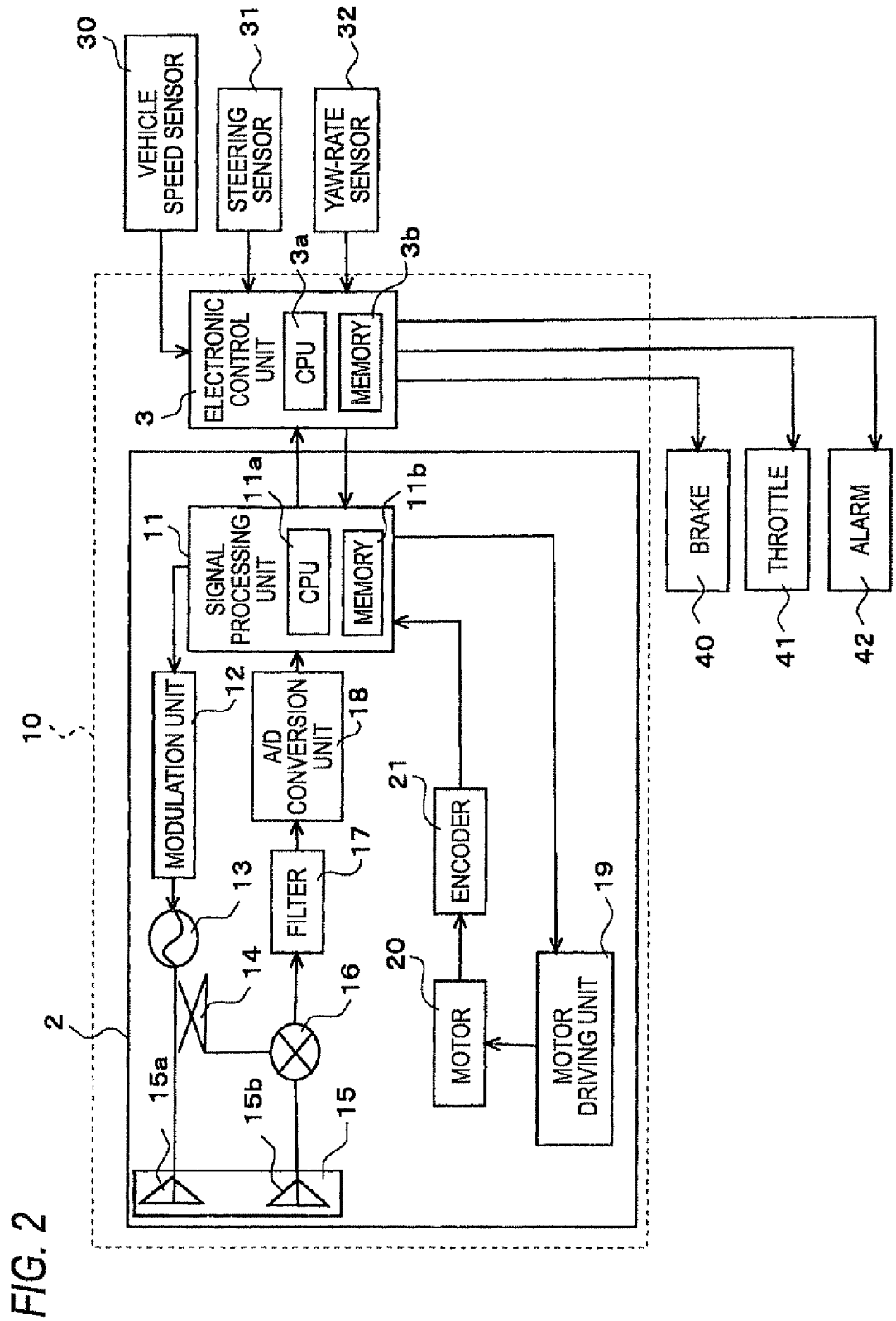
FIG. 2 is a block diagram of an object detection system.

FIG. 2 is a block diagram of an object detection system. The object detection system 10 is configured by a radar apparatus 2 and an electronic control unit 3 which are electrically connected together. Also, the electronic control unit 3 of the object detection system 10 is electrically connected to various types of sensors installed in a vehicle 1, such as a vehicle speed sensor 30, a steering sensor 31, a yaw-rate sensor 32, and the like. Further, the electronic control unit 3 is electrically connected to a vehicle control device installed in the vehicle 1, such as a brake 40, a throttle 41, an alarm 42, and the like.

The radar apparatus 2 includes a signal processing unit 11, a modulation unit 12, a VCO (Voltage Controlled Oscillation) unit 13, a directional coupler 14, a planar antenna 15, a mixer 16, a filter 17, an A/D (Analog-to-Digital) converter 18, a motor driving circuit 19, a motor 20, and an encoder 21. In this case, the planar antenna 15 is composed of a transmission antenna 15a and a reception antenna 15b. In an embodiment of the invention to be described hereinafter, it is exemplified that the antenna scanning type of the radar apparatus 2 is a mechanical scan type that drives the antenna in a predetermined direction. However, the present invention may be applied to an electronic scan type that adopts a DBF (Digital Beam Forming) type or the like in estimating the direction of the object without driving the antenna.

In the object detection by the radar apparatus 2, the modulation unit 12 generates a modulated signal of a predetermined frequency band based on a signal from the signal processing unit 11. This modulated signal is converted into a transmitted signal by the VCO 13, and is output from the transmission antenna 15a of the planar antenna 15 through the directional coupler 14 as a transmitted wave.

The transmitted wave output from the planar antenna 15 is reflected from an object, and is received in the planar antenna 15 as a reflected wave. The received reflected wave and an oscillating signal pass through the directional coupler 14 and are mixed in the mixer 16.

The received signal mixed with the transmitted signal is a beat signal that includes information on a relative distance from the object or a relative speed, and is filtered by the filter 17. Accordingly, the beat signal of a band, which includes the information on the relative distance from the vehicle 1 provided with the radar apparatus 2 to the object, and the relative speed, is detected.

The beat signal filtered in a predetermined frequency band by the filter 17 is converted from an analog signal into a digital signal by the A/D converter 18, and then is input to the signal processing unit 11.

The radar apparatus 2 makes the planar antenna 15 scan in a predetermined angle range. The angle of the planar antenna 15 becomes 0° if the planar antenna 15 is in a state perpendicular to the front vehicle in the case where the radar apparatus 2 is provided on a front bumper portion of the vehicle 1 and the front vehicle is positioned just in front of the vehicle 1. For example, the planar antenna 15 scans left and right by 15°, respectively, from the state of 0°. The scanning of the planar antenna 15 is performed using the motor driving unit 19 and the motor 20, and information on the number of slits which the encoder 21 has passed through in accordance with the scanning of the planar antenna 15 and the passing direction of the encoder 21 is output to the signal processing unit 11.

The signal processing unit 11 includes a CPU 11a, which performs control of respective portions of the radar apparatus 2 and performs information processing in the case where the CPU 11a performs data transmission/reception with the electronic control unit 3, and a memory 11b in which a program for the processing of the CPU 11a is stored. The various types of function of the CPU 11a are realized by executing the program. Based on the signal output from the A/D converter 18, the relative distance or the relative speed of the object against the vehicle 1 is detected. Also, the angle of the object against the vehicle 1 is detected from the information output from the encoder 21. As described above, the above-described information is detected as parameter values of the respective object data.

In this embodiment, the object information detected by the radar apparatus 2 is called object data, and the relative distance, the relative speed, and the angle exist as the parameter values of the object data. Also, in the memory 11b of the signal processing unit 11, a plurality of data, such as the object data detected in the past object detection process, and the like, is stored.

The electronic control unit 3 that is electrically connected to the signal processing unit 11 includes a CPU 3a and a memory 3b. The CPU 3a performs control of respective portions of the vehicle 1 and performs information processing when the CPU 11a performs data transmission/reception with the signal processing unit 11. Also, the memory 3b stores a program for the processing of the CPU 3a. The memory 3b further stores object data transmitted from the signal processing unit 11. The various types of function of the CPU 3a are realized by executing the program.

The electronic control unit 3 is electrically connected to the brake 40, the throttle 41, and the alarm 42, and by controlling them in accordance with the object data, the operation of the vehicle 1 is controlled. For example, if the distance between the vehicle 1 and the object is near, the alarm 42 generates an alarm signal to report an abnormal state to a driver who is a user. Also, if there is a possibility that the vehicle 1 will collide with the object, the electronic control unit 3 lowers the speed of the vehicle 1 by operating the brake 40 or lowers the number of revolutions of an engine by tightening the throttle 41.

Further, the electronic control unit 3 is connected to the vehicle speed sensor 30 detecting the speed of the vehicle 1, the steering sensor 31 detecting a steering angle of a steering wheel, and the yaw-rate sensor 32 detecting a swing speed of the vehicle 1. In this case, by using both the steering sensor 31 and the yaw-rate sensor 32, it is possible to detect the swing direction and the swing speed of the vehicle 1 in accordance with the steering manipulation. Accordingly, although it is preferable to provide both sensors, it is possible to detect the swing direction of the vehicle 1 using either the steering sensor 31 or the yaw-rate sensor 32.

Also, the transmitted wave and the received wave, which are transmitted and received through the planar antenna 15, may correspond to signals such as radio waves, laser beams, or ultrasonic waves, and it is sufficient if the waves are transmitted from the planar antenna 15, reflected from an object, and received as reflected waves to detect the object data.

In this embodiment, it is exemplified that the antenna is the planar antenna 15. However, it is sufficient if the antenna is a lens antenna or a reflecting mirror antenna, in addition to the planar antenna 15, which can output the transmitted wave and receive the reflected wave from the object. Although it is exemplified that the transmission antenna 15a and the reception antenna 15b are separately provided, an antenna that can perform both the transmission and reception may be used instead.

Next, an FM-CW (Frequency Modulated Continuous Wave) system will be described as an example of signal processing for use in the object detection process. In this embodiment, although it is exemplified that the FM-CW system has been adopted, the present invention is not limited thereto, and it is sufficient if the system calculates the object data by combining a plurality of periods such as an up period and a down period.

Figure 3:
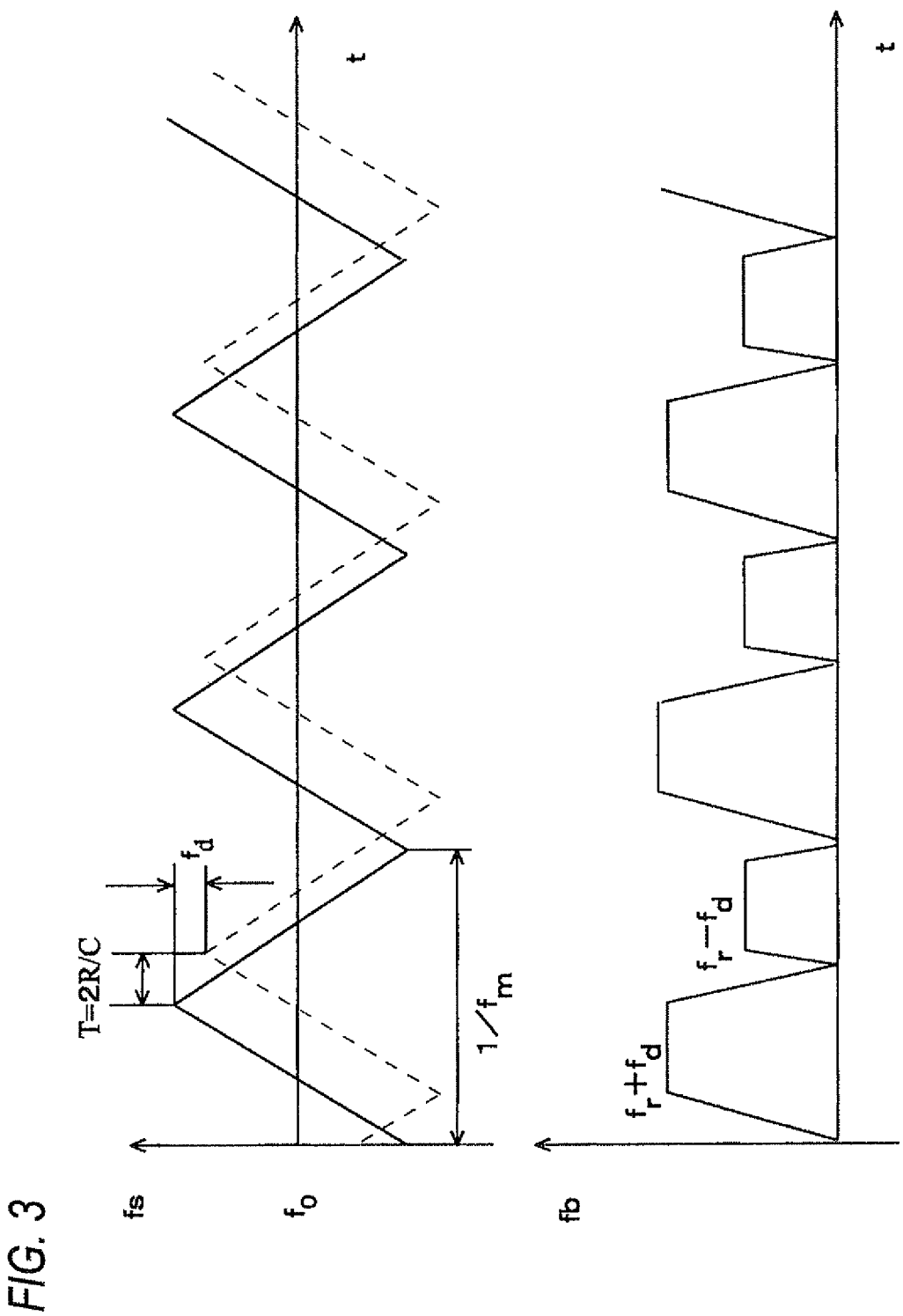
FIG. 3 is a diagram illustrating an FM-CW signal and a beat signal.

Also, respective symbols related to the FM-CW signal and the beat signal, which are indicated in the following equation and in FIG. 3, are as follows. That is, fb is a beat frequency, fs is a frequency, fr is a distance frequency, fd is a speed frequency, fo is a center frequency of a transmitted wave, Δf is a frequency shift width, fm is a repeated frequency of a modulated wave, C is the speed of light (the speed of a radio wave), T is a turnaround time of a radio wave to an object, R is a distance up to an object, and v is a relative speed against an object.

The upper portion of FIG. 3 shows signal waveforms of the transmitted signal and the received signal of the FM-CW. Also, the lower portion of FIG. 3 shows a beat frequency that is generated by a difference in frequency between the transmitted signal and the received signal. In the upper portion of FIG. 3, the horizontal axis represents time and the vertical axis represents frequency. In the drawing, the transmitted signal indicated by a solid line has a frequency that is changed in a predetermined period, and includes an up period in which the frequency ascends and a down period in which the frequency that has ascended up to a predetermined frequency descends. The transmitted signal repeats a constant change in a manner such that it descends down to a predetermined frequency, and then ascends again up to another predetermined frequency. Also, the transmitted signal is reflected from the object, and then is received as the received signal as indicated by a dashed lined in the same drawing. In the same manner as the transmitted signal, up and down periods also exist in the received signal. In this embodiment, an example of a used frequency band is a frequency of 76 GHz.

Also, in accordance with the distance between the vehicle 1 and the object, a time delay (T=2R/C) occurs in the received signal in comparison to the transmitted signal. Further, if there is a difference in speed between the vehicle 1 and the object, the received signal is shifted in parallel to the axis of the frequency fs in comparison to the transmitted signal. This amount of Doppler shift becomes fd.

In the lower portion of FIG. 3, the horizontal axis represents time and the vertical axis represents frequency. The beat frequency is calculated based on Equation (1).

$$fb = fr \pm fd = (4 \cdot \Delta f \cdot fm / C) R + (2 \cdot fo / C) v \qquad (1)$$

At this time, by performing an FFT to be described later with respect to the beat signal as indicated in Equation (1), frequency spectrums are detected. A frequency spectrum that exceeds a predetermined threshold value among the detected frequency spectrums is detected as a peak signal, and a following process is performed with respect to the peak signal to calculate the relative distance, the relative speed and the angle between the vehicle 1 and the object.

<2. Operation>

Figure 4:
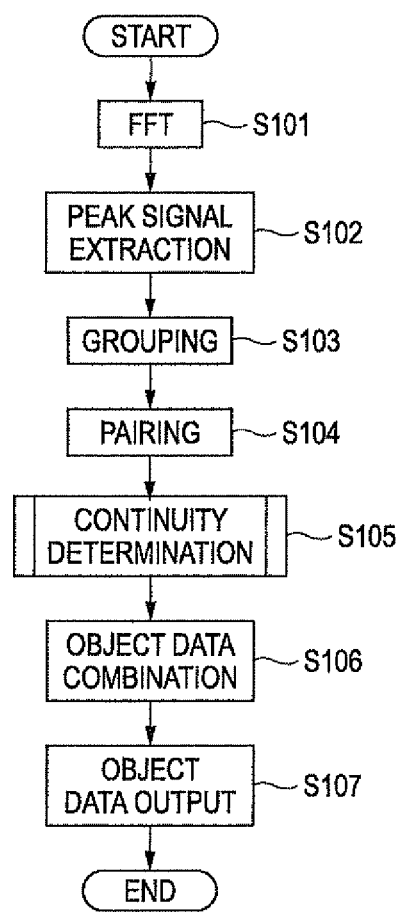
FIG. 4 is a flowchart illustrating an object detection process.

FIG. 4 is a flowchart illustrating an object detection process. The bit signal that is generated by mixing the transmitted signal and the received signal is A/D-converted by the A/D converter (Analog-to-Digital converter) 18, input to the signal processing apparatus such as a microcomputer, and then is FFT (Fast Fourier Transform)-transformed by the signal processing apparatus (step S101).

The FFT-transformed beat signal is detected as a frequency spectrum. In general, since the frequency spectrum of the object has a power level that is relatively higher than that of the frequency spectrum such as noise or the like, the frequency spectrum that exceeds the threshold value that is set at a predetermined power level is extracted as a peak signal (step S102).

A plurality of peak signals extracted by angles of the antenna is grouped into one group based on information on the speed of the vehicle 1, the signal intensity of the peak signal, and the angle of the peak signal (step S103). As a result, a plurality of groups including a plurality of peak signals is generated in the up period and the down period, respectively. Here, the grouping process is performed in a manner that the received signals received from a predetermined reflection range of the object are detected as the plurality of peak signals for continuous angles of the object, and the plurality of peak signals in the predetermined angle range for the continuous angles is considered as one group, and this group is processed as one reflection point.

Also, the peak signals of the plurality of groups generated in the up period and the peak signals of the plurality of groups generated in the down period are paired based on information on the speed of the vehicle 1, the signal intensities of the grouped peak signals, and the angles of the grouped signals (step S104). By this pairing process, the relative distance, the relative speed, and the angle of the object against the vehicle 1 are detected as the object data.

Also, a continuity determination process for determining whether the object data detected this time is continuously detected as the same object data as the past object data detected last time, or whether the object data detected this time is new object data that was not detected last time is performed (step S105). This continuity determination process will be described in detail later.

After the continuity determination process of the object data is ended, object data combination is performed (step S106). This object data combination is a data combination process for constructing one object by combining the object data if the respective object data is information on the relative distance, the relative speed, and the angle of one object against one reflection point. Specifically, object data based on a plurality of reflection points from a moving object such as a car, a truck, or a bike or a standstill object such as a guard rail or an iron bridge are combined.

The combined object data is output to the electronic control unit 3 (step S107). Based on the output object data, the electronic control unit 3 performs the vehicle control such as manipulation of the brake 40, manipulation of the throttle 41, manipulation of the alarm 42, and the like.

Next, the continuity determination process as described in step S105 of FIG. 4 will be described in detail using the flowchart of the continuity determination process of FIG. 5. Here, the continuity determination is a process of determining whether the object data detected this time is continuously detected as the same object data as the past object data detected last time, or whether the object data detected this time is the newly detected object data that does not have continuity with the past object data.

Figure 6:
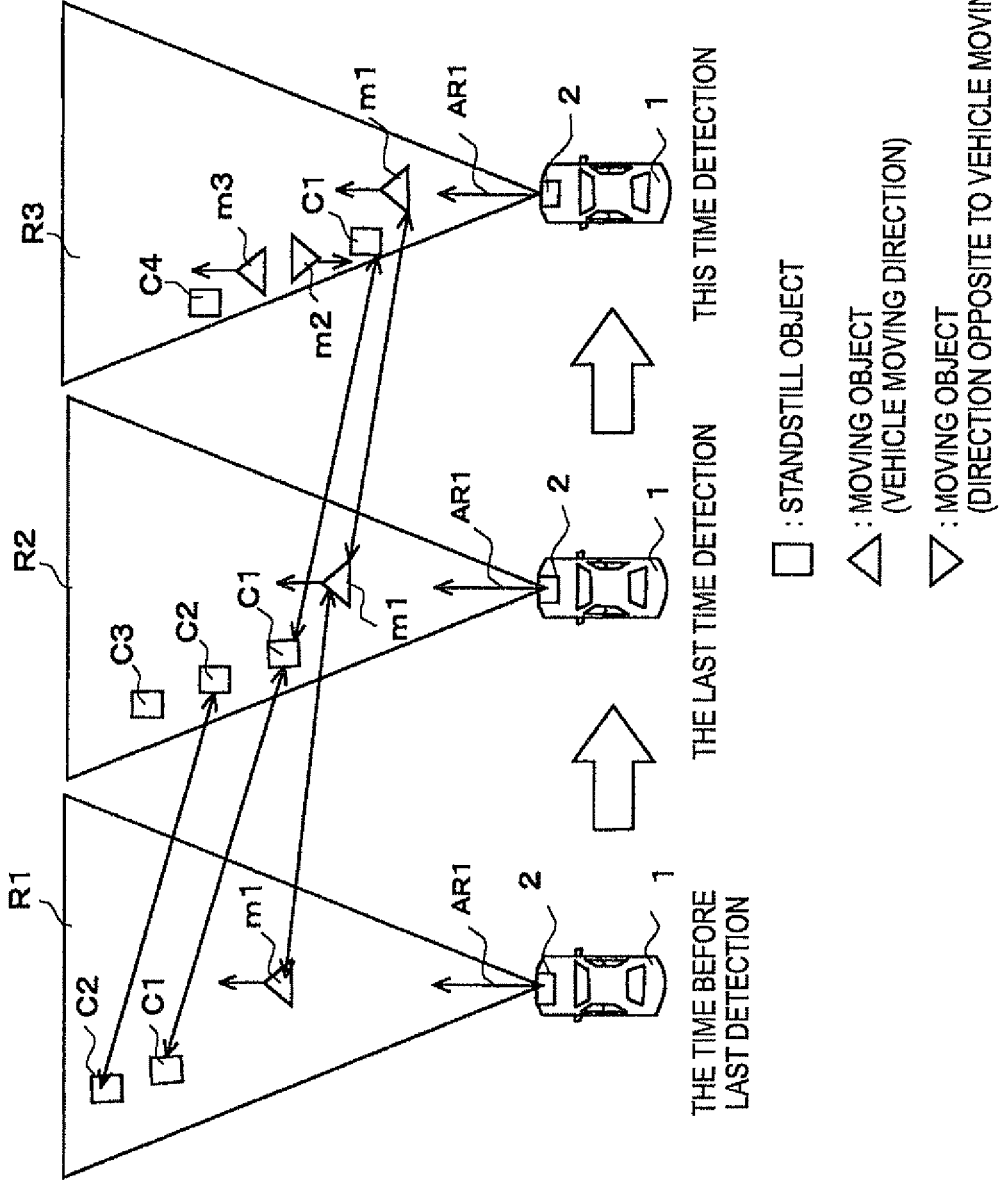
FIG. 6 is a diagram illustrating a continuity determination process of object data.

First, the object data detected last time, which is stored in the memory 11b of the signal processing apparatus 11, is read (step S201). Then, it is determined whether the same object is continuously detected by comparing the object data detected this time with the object data detected last time (step S202), A detailed example of the continuity determination will be described with reference to FIG. 6 illustrating the continuity determination process of the object data. A tetragon or a triangle that is detected within the detection ranges R1 to R3 of the radar apparatus 2 provided in the vehicle 1 of FIG. 6 represents the object data. The tetragon represents standstill data and the triangle represents moving data. The triangular moving object data moves in the direction of an arrow attached to the corresponding triangle. Here, the standstill object means an object that is at a standstill on the ground, and the moving object is an object that moves against the ground.

In the time before last process in the left portion of FIG. 6, the vehicle 1 moves in the direction of an arrow AR1. Also, using the radar apparatus 2 mounted on the vehicle 1, object data of the moving object m1 that moves in the same direction as the vehicle 1, a standstill object c1, and a standstill object c2 are detected within the object detection range R1.

In the last time detection in the center portion of FIG. 6, by the vehicle 1 that moves in the direction of the arrow AR1 at a predetermined speed, the moving object m1 that moves at a predetermined speed in the same direction as the vehicle 1 is detected within the object detection range R2. Also, the moving object m1 detected last time and the moving object m1 detected the time before last are determined as the same object, i.e. the moving object data having continuity, from the information on the speed of the vehicle 1, the signal intensity, and the angle.

Also, in the this time detection in the right portion of FIG. 6, as the vehicle 1 moves in the direction of the arrow AR1 at a predetermined speed, the moving object m1 that moves at a predetermined speed in the same direction as the vehicle 1 is detected within the object detection range R3. Also, the moving object m1 detected this time and the moving object m1 detected last time are determined as the same object, i.e. the moving object data having continuity, from the information on the speed of the vehicle 1, the signal intensity, and the angle.

The same process is performed with respect to the standstill object data. For example, the standstill object c1 detected the time before last, the standstill object c1 detected last time, and the standstill object c1 detected this time are determined as the same object, i.e. the standstill objects having the continuity, from the information on the speed of the vehicle 1, the signal intensity, and the angle. In the continuity determination process as described above, the continuity with the past object data detected last time, which is prior to this time, is determined with respect to the object data detected this time.

Figure 5:
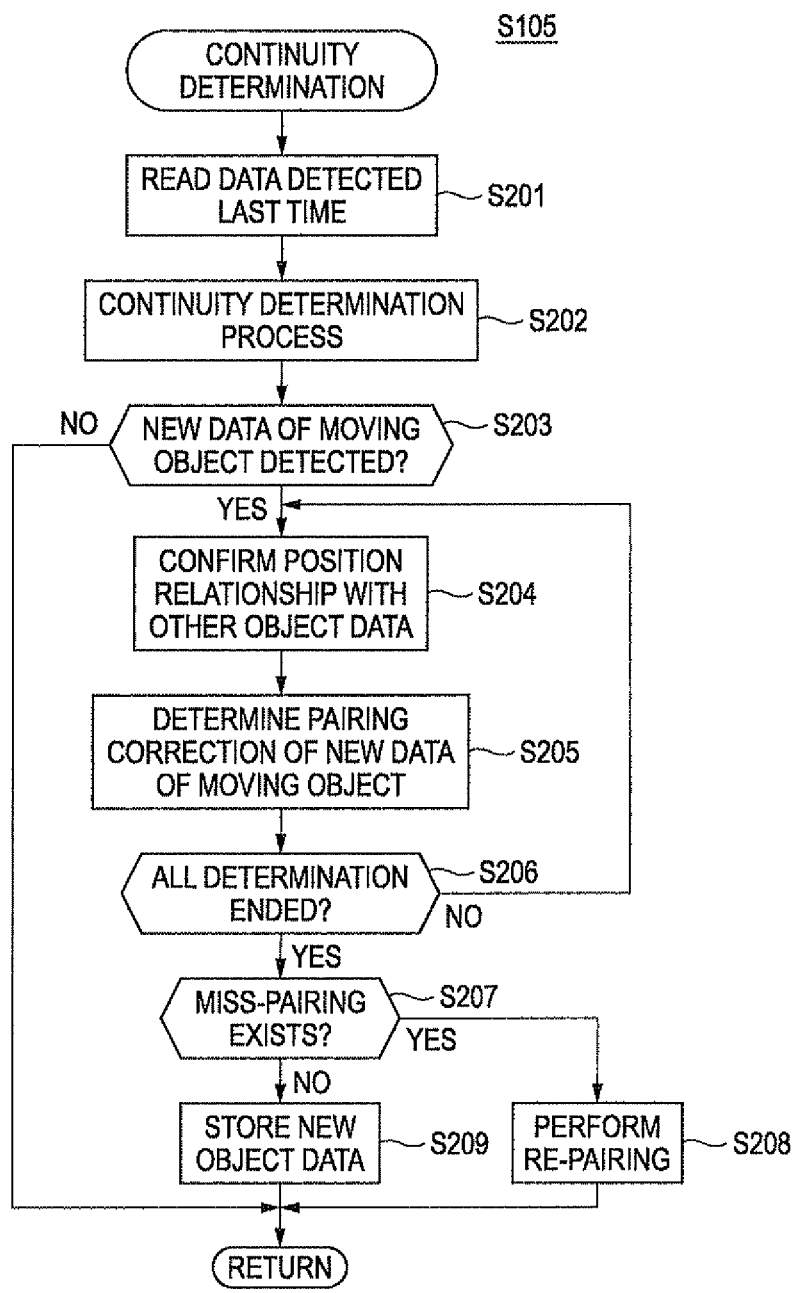
FIG. 5 is a flowchart illustrating a continuity determination process.

Referring again to the flowchart of FIG. 5, after the continuity determination process in step S202 is ended, the object data that is determined not to have the continuity is considered as new object data. FIG. 6 shows new object data in the case of comparing the standstill object c3 detected last time in the center portion of the drawing with the data detected the time before last in the left portion of the drawing, and new object data in the case of comparing the standstill object c4, the moving object m2, and the moving object m3 detected this time in the right portion of the drawing with the data detected last time in the center portion of the drawing.

As seen from the data detected this time, as described above, the new object data of the moving object that is compared with the data detected last time are the moving object m2 and the moving object m3, and if such new data of the moving object exists ("Yes" in step S203), it is determined whether new data of the moving object is accurately paired object data (step S205) by confirming the position relationship between the new data of the moving object and other object data (e.g. the distance and angle) (step S204). If the new data of the moving object is not detected after the continuity determination process in step S202 is ended ("No" in step S203), the process is ended.

In the flowchart of FIG. 5, the confirmation of the position relationship between the new data of the moving object and the other object data (step S204) and the determination process of whether the new data of the moving object is accurately paired object data (step S205) will be described using the drawing of the miss-pairing process of the new data of the moving object of FIG. 7.

As shown as this time detection A in the left portion of FIG. 7, the position relationship between the new data of the moving object m2 (hereinafter referred to as the "moving object m2") among the data detected this time and all other object data within the object detection range R3 is confirmed (step S204 in FIG. 5).

Figure 7:
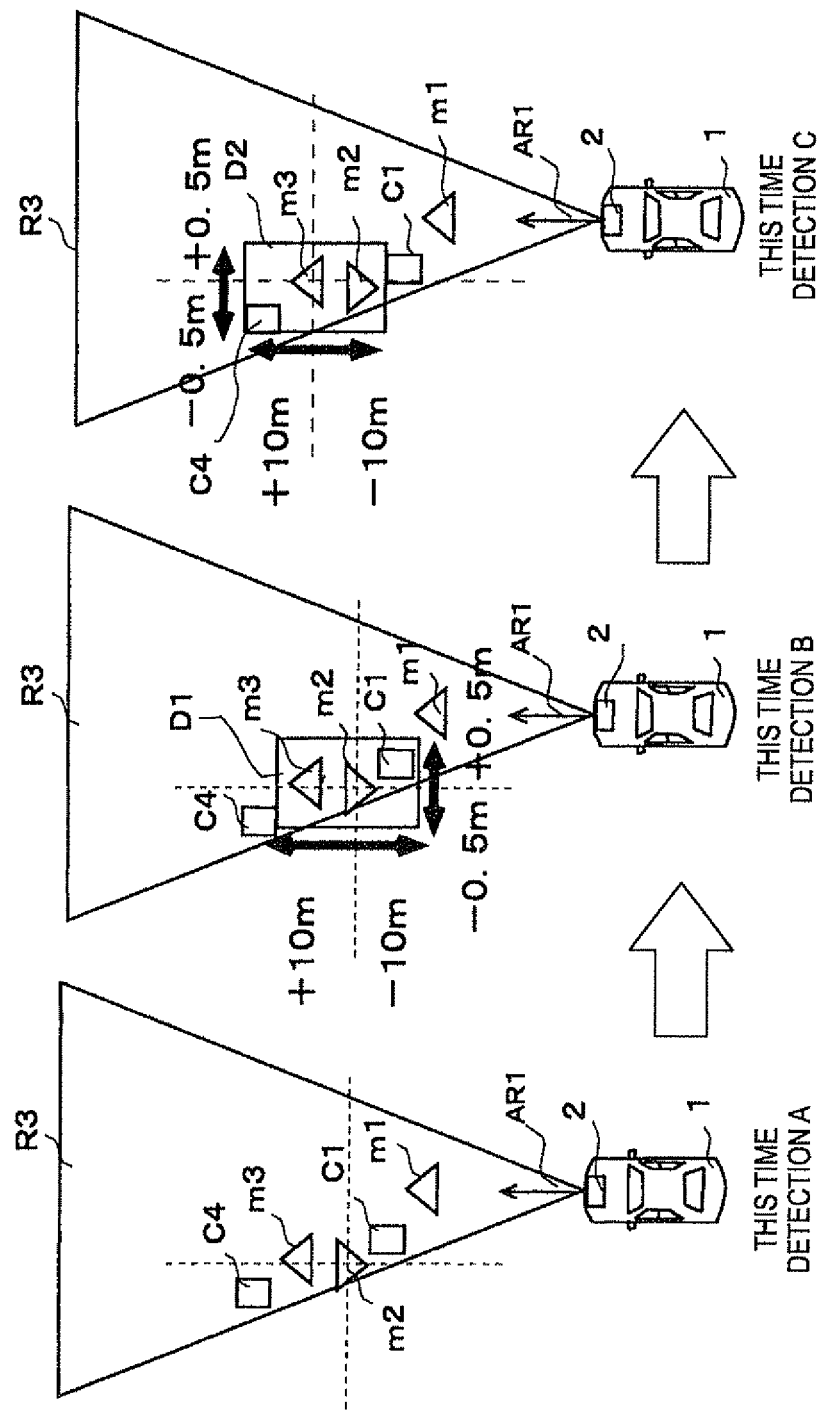
FIG. 7 is a diagram illustrating a miss-pairing determination process of new data of a moving object.

Then, as shown as this time detection B in the center portion of FIG. 7, the object data is detected within a determination area D1 that is determined by a distance (e.g. 10 m) that the moving object m2 moves for a predetermined time (e.g. several seconds) in the moving direction of the moving object m2 and also in the direction opposite to the moving direction of the moving object m2 briefly centering around the moving object m2, and a distance that is shorter than the width of a road (e.g. 0.5 m in the ease where the width of the road is 1.8 m) in the respective directions which are orthogonal to the moving direction of the moving object m2.

In this case, the reason why the distance is set to be shorter than the width of the road in the respective directions which are orthogonal to the moving direction of the moving object m2 centering around the moving object m2 in the determination area D1 is to make the standstill object which is an object on the road side excluded from the range of the miss-pairing determination if the new data of the moving object is detected on the same axis in the moving direction of the vehicle 1 within the detection range R3 of the vehicle 1 in a state where the vehicle 1 travels in the vicinity of the center of the road. Accordingly, the determination of the new data of the moving object can be accurately performed by the miss-pairing of the standstill object data, and the new data of the moving object in an area where no standstill object exists is prevented from being wrongly determined as miss-pairing.

A detailed example of determination is that the object data exists within the determination area D1, and a standstill object c1 exists in the front in the moving direction of the moving object m1. In this case, if the moving direction and speed of the moving object m2 from the moving object m2 is, for example, 50 km/hour, the moving object m2 may collide with the standstill object c1 that is in a distance of 10 m. Accordingly, in the case where the new data of the moving object exists in the above-described position, it is determined as miss-pairing data (error data). Or, the pairing process is performed again.

Accordingly, by determining whether the moving object data is error data caused by miss-pairing based on the determination area that is prescribed by the newly detected moving object data, the determination of miss-pairing is performed early enough with respect to a small number of subjects to be determined, and thus the wrong vehicle control is prevented to guarantee the safety of the vehicle user. Or, by performing the pairing process again, accurate object data can be detected.

Also, in order for the moving object m2 that does not exist in the data detected last time to exist within the determination area D1 of the data detected this time, it is required that the moving object m2 comes out of the last time detection range R2, enters into the this time detection range R3, closely passes by a moving object m3, and then reaches the current position of the moving object m2 for a minute time (e.g. several milliseconds) from the last time detection to the this time detection. Accordingly, in the case where the new data of the moving object exists in the above-described position, it is determined as miss-pairing data (error data). Or, the pairing process is performed again with respect to the new data of the moving object.

Accordingly, on the basis of the newly detected moving object data, by determining whether the moving object data is caused by miss-pairing based on the object data in the vicinity of either of before and after the moving object data, the determination of miss-pairing is performed early enough with respect to a small number of subjects to be determined, and thus wrong vehicle control is prevented to guarantee the safety of the vehicle user. Or, by performing the pairing process again with respect to the new data of the moving object, accurate object data can be detected.

Further, although it is required that the moving object m2 that is positioned between the standstill object c1 and the moving object m3 comes out of the last time detection range R2, enters into the this time detection range R3, and is located between the standstill object c1 and the moving object m3, in the case of considering the driving capability of the vehicle, it may not be possible that the moving object m2 exists in the position of the moving object m2 as indicated in the this time detection A in such a minute time. Accordingly, in the case where the new data of the moving object exists in the above-described position, it is determined as miss-pairing data (error data). Or, the pairing process is performed again with respect to the new data of the moving object.

Accordingly, on the basis of the newly detected moving object data, by determining whether the moving object data is caused by miss-pairing based on the object data in the vicinity of either of before and after the moving object data, the determination of miss-pairing is performed early enough with respect to a small number of subjects to be determined, and thus the wrong vehicle control is prevented to guarantee the safety of the vehicle user. Or, by performing the pairing process again with respect to the new data of the moving object, accurate object data can be detected.

As described above, if at least one of the standstill object data and the moving object data exists within the determination area D1 centering around the new data of the moving object m2, if the object data exists in the vicinity of either of before and after the moving direction of the new data of the moving object m2 from the new data of the moving object m2 within the determination area D1, and if the object data exists in the vicinity of both before and after the moving direction of the new data of the moving object m2 within the determination area D1, the new data of the moving object m2 is detected in a position where the new data of the moving object m2 cannot originally exist, and thus it is determined as the object data caused by miss-pairing. That is, if the new data of the moving object m2 corresponds to any one of three determination methods as described above, it is determined as the object data caused by miss-pairing. Or, the pairing process is performed again with respect to the new data of the moving object m2.

Also, after the determination of the new data of the moving object m2 is ended, the determination of another new data of the moving object (in this embodiment, the new data of the moving object m3) is made in a manner that by confirming the position relationship between the new data of the moving object m3 (hereinafter referred to as the "moving object m3") and all the object data within the detection range R3 as illustrated as the this time detection C in the right portion of FIG. 7, it is determined whether the object data exists within the determination area D2 centering around the moving object m3, or whether the moving object m3 is caused by miss-pairing by the position relationship between the moving object m3 and the object data within the determination area D2.

Also, the pairing correction determination is performed, for example, in the order of their distance from the vehicle 1 with respect to the whole new data of the moving objects, and if all the determinations are ended ("Yes" in step S206 as shown in FIG. 5), the processing proceeds to step S207. In this case, if all the determinations are not ended ("No" in step S206), the position relationship between the new data of the moving object of which the determination is not ended and other object data is confirmed (step S204).

If there is miss-pairing data ("Yes" in step S207) after all the determination processes are ended ("Yes" in step S206), the pairing is performed again only with respect to the new data of the moving object determined as miss-pairing (step S208). As described above, by performing the pairing again only with respect to the wrongly paired data (error data), the error data can be made as normal pairing data with a small amount of processing, and thus wrong vehicle control is prevented to guarantee the safety of the vehicle user.

Also, instead of performing the miss-pairing determination (step S206) as described above, the pairing process may be performed again (step S208).

If there is no miss-pairing data ("No" in step S207), the object data detected this time is stored in the memory 11b of the signal processing apparatus 11 (step S209) to be used in processing the continuity determination after the next time or to be output to the electronic control unit 3 as the subject of vehicle control. Accordingly, the determination of miss-pairing is performed early enough, and thus wrong vehicle control is prevented to guarantee the safety of the vehicle user.

Figure 8:
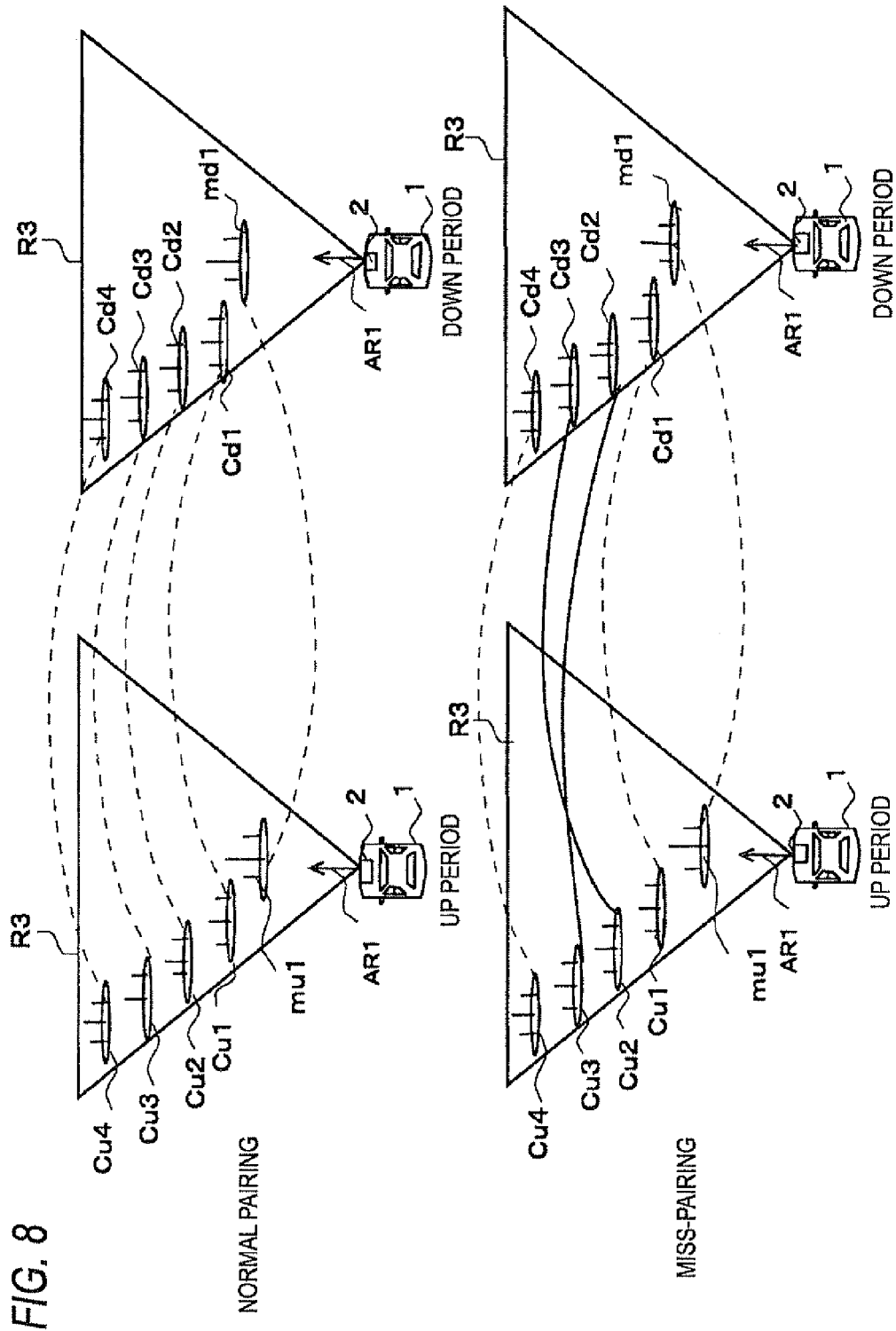
FIG. 8 is a diagram illustrating pairings in an up period and in a down period.

FIG. 8 is a diagram illustrating pairings in an up period and in a down period of the object data in the determination area of this time detection of FIG. 7. The case where grouped peak signals in the up period and the down period are normally paired is shown in the upper portion of FIG. 8. As shown in the drawing, mu1 in the up period of the grouped peak signals within the detection range R3 of the radar apparatus 2 provided in the vehicle 1 and md1, cu1 and cd1, cu2 and cd2, cu3 and cd3, and cu4 and cd4 in the down period are paired based on the speed of the vehicle 1, the signal intensity of the grouped peak signal, and the angle.

In contrast, if normal pairing is performed as illustrated in the lower portion of FIG. 8 in a state where miss-pairing as described with reference to FIG. 7 occurs, cu2 in the up period and cd1 in the down period are paired, and cu2 and cd2 are not paired. However, if cu2 in the up period and cd3 in the down period are paired and cu3 and cd2 are paired in error, the new data of the moving object, which did not exist originally, is detected. In this embodiment, such miss-pairing is removed by the miss-pairing determination process. Accordingly, for example, as the result of detecting a structure that is far apart from the vehicle 1 by expanding the transmitted wave transmitted from the radar apparatus 2 in the height direction of the transmitted wave at a distance of about 100 m from the vehicle, such as the structure (specifically, an iron bridge, an overhead bridge, or the like) that is far apart from the vehicle 1, the moving object data, which did not exist originally, is detected. In this case, the detection of an object that is at a long distance of about 100 m can be performed without limiting the object detection range to a distance where no miss-pairing occurs (e.g. 50 m). Accordingly, vehicle control in an early stage becomes possible, and thus the vehicle user can comfortably control the vehicle or cope with vehicle control automatically performed.

What is claimed is:

1. A signal processing apparatus that performs an object detection process of detecting object data with respect to peak signals which indicate a difference in frequency between a transmitted signal of which the frequency is changed in a predetermined period and a received signal which is obtained by receiving a reflected wave that corresponds to a transmitted wave which is based on the transmitted signal and is reflected from an object, by deriving the peak signals in a first period where the frequency of the transmitted signal ascends and in a second period where the frequency of the transmitted signal descends and by pairing the peak signals in the first period and the second period, the signal processing apparatus comprising:
   a continuity determination section that determines a continuity between the object data and past object data detected prior to the object data;
   a moving object data detection section that detects among the object data, newly detected moving object data that is determined by the continuity determination section as having no continuity with the past object data;
   a positional relationship detection section that detects a positional relationship between the moving object data that is detected by the moving object data detection section and other object data; and
   a data determination section that re-pairs the moving object data if one object data among the other object data has a predetermined positional relationship with the moving object data, the predetermined positional relationship being a positional relationship in which the other object data exists within a determined area that is prescribed by the position of the moving object data.

2. The signal processing apparatus as set forth in claim 1, wherein the predetermined positional relationship is a positional relationship in which the other object data exists in the vicinity of either the front or the rear in the traveling direction of the moving object data.

3. The signal processing apparatus as set forth in claim 1, wherein the predetermined positional relationship is a positional relationship in which the other object data exists in the vicinity of both the front and the rear in the traveling direction of the moving object data.

4. The signal processing apparatus as set forth in claim 1, further comprising performing section that performs a re-pairing process only with respect to error data if there is the data that is determined as the error data by the data determination section.

5. A radar apparatus comprising:

the signal processing apparatus as set forth in claim 1;

an output and reception section that outputs the transmitted wave and receives the reflected wave; and an object information output section that outputs object information detected in the object detection process to an electronic control device which uses the object information.

6. An object detection system comprising:

the radar apparatus as set forth in claim 5; and a detection section that detects an object based on the object data output from the radar apparatus.

7. A signal processing method comprising:

(A) performing on a processor an object detection process of detecting object data with respect to peak signals which indicate a difference in frequency between a transmitted signal of which the frequency is changed in a predetermined period and a received signal which is obtained by receiving a reflected wave that corresponds to a transmitted wave which is based on the transmitted signal and is reflected from an object, by deriving the peak signals in a first period where the frequency of the transmitted signal ascends and in a second period where the frequency of the transmitted signal descends and by pairing the peak signals in the first period and the second period;

(B) determining a continuity between the object data and past object data detected prior to the object data;

(C) detecting among the object data, newly detected moving object data that is determined in the step (B) as having no continuity with the past object data;

(D) detecting a positional relationship between the moving object data that is detected in the step (C) and other object data; and (E) re-pairing the moving object data if one object data among the other object data has a predetermined positional relationship with the moving object data, the predetermined positional relationship being a positional relationship in which the other object data exists within a determined area that is prescribed by the position of the moving object data.

8. A computer-readable medium recording a program causing a computer to execute the method as set forth in claim 7.

\* \* \* \* \*